United States Patent Office  3,470,241
Patented Sept. 30, 1969

3,470,241
CYCLOPROPANE INTERMEDIATES
FOR IRONES
Albert Eschenmoser and Dorothea Felix, Zurich, and Max Stoll, Geneva, Switzerland, assignors to Firmenich & Cie, Geneva, Switzerland
No Drawing. Original application Feb. 12, 1964, Ser. No. 356,996. Divided and this application Feb. 5, 1968, Ser. No. 724,302
Int. Cl. C07c 69/12, 49/26; C11b 9/00
U.S. Cl. 260—488  3 Claims This application is a division of our application Ser. No. 356,996, filed Feb. 12, 1964.

The present invention relates to a new process for the preparation of irones which are highly valuable odoriferous substances useful in the perfume industry. The invention also relates to new cyclopropane derivatives which are useful as intermediates in the synthesis of irones, and to a process for the preparation of the said cyclopropane derivatives.

The known methods for the preparation of irones are caomplex and comprise a relatively high number of steps so that the resulting products are used to a limited extent only in the perfume industry due to their high price.

We have now found a new method for synthesizing the irones from an easily accessible and cheap starting material. This method is much simpler and more economical than any of the known syntheses so that the irones can be obtained at substantially reduced costs.

According to this invention, irones are prepared by treating 1,1-dimethyl-2-(3-methyl-7-oxo - 3,5 - octadien-1-yl)-cyclopropane with an acidic reagent so as to cause the opening of the cyclopropane ring and the cyclization of the product to form irone.

The opening of the cyclopropane ring and the formation of the six-membered irone ring can be brought about by means of the same acidic reagents as those conventionally used for cyclizing pseudo-irone. Thus, Bronated acids, i.e. inorganic and organic acids, can be used as the acid reagent for carrying out the process of this invention. Examples of such acids include sulfuric acid, phosphoric acid, mixtures of sulfuric acid with acetic acid. Buffering mixtures comprising an acid and a salt, e.g. a mixture of phosphoric acid and monosodium phosphate may also be used as the acidic reagent. Furthermore, compounds of the type of the Lewis acids such as boron trifluoride and aluminum chloride are also suitable for carrying out the process of this invention. According to the specific acidic reagent used and the specific conditions (time, temperature, etc.) under which the reaction is carried out the reaction product will contain a major proportion of α-irone or β-irone as is the case in the cyclization of pseudo-irone.

It was surprising to find that under the same reaction conditions as applied to the known cyclization of pseudo-ionone or pseudo-irone the opening of the cyclopropane ring in 1,1-dimethyl-2-(3-methyl - 7 - oxo-3,5-octadien-1-yl)-cyclopropane with intermediary formation of pseudo-irone would take place so easily. Under the reaction conditions the pseudo-irone undergoes cyclization as it is formed.

According to the present invention the 1,1-dimethyl-2-(3 - methyl-7-oxo-3,5-octadien-1-yl)-cyclopropane serving as an intermediate in the preparation of irone is obtained by reacting pseudo-ionone in an inert and humidity-free atmosphere with bis(iodomethyl) zinc.

A preferred mode of carrying out this process consists in adding dropwise an ethereal solution of zinc iodide to an ethereal solution of diazomethane. The formation of bis(iodomethyl) zinc is accompanied by the evolution of nitrogen gas. To the resulting ethereal solution of the reagent there is then added pseudo-ionone at a temperature below 0° C., e.g. between —5° and —10° C. All these operations are carried out in an inert and humidity-free atmosphere, e.g. under nitrogen.

The bis(iodomethyl) zinc reagent is capable of adding very easily a methylene group to the double bond of the terminal isopropylidene group in pseudo-ionone. The reaction can be represented by the following reaction scheme:

$$CH_3-C=CH-CH_2-CH_2-C=CH-CH=CH-C-CH_3$$
$$\quad\quad |\quad\quad\quad\quad\quad\quad\quad |\quad\quad\quad\quad\quad\quad ||$$
$$\quad\quad CH_3\quad\quad\quad\quad\quad\quad CH_3\quad\quad\quad\quad\quad O$$

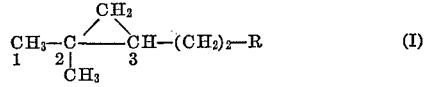

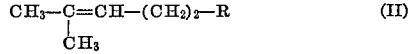

It was unexpected to find that this reaction was highly selective and that the bis(iodomethyl) zinc attacked only the double bond of the terminal isopropylidene group but not the conjugated double bonds.

Under the action of acidic reagents as defined above the cyclopropane ring of the methylenated pseudo-ionone opens very easily with formation of a methyl group in the 3-position of the pseudo-ionone. This is a new and very simple way of introducing directly a methyl group in the 3-position of pseudo-ionone and of obtaining pseudo-irone in a very economical manner from a readily accessible starting material.

1,1-dimethyl-2-(3 - methyl - 7 - oxo-3,5' octadien-1-yl)-cyclopropane as a new compound which is useful as an intermediate in the preparation of irone is also part of the present invention.

The present invention further relates to compounds of the formula

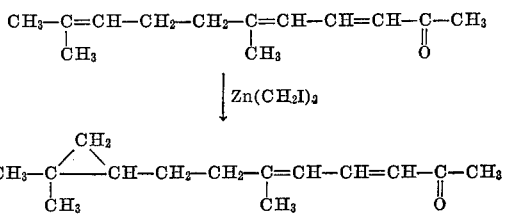

wherein R represents one of the radicals —CO—CH$_3$,

—C(OH)(CH$_3$)—CH=CH$_2$,

C(CH$_3$)=CH—CH$_2$OOCCH$_3$ and —C(CH$_3$)=CH—CHO.

According to the invention the compounds of Formula I are obtained by reacting compounds of the formula $$CH_3-C=CH-(CH_2)_2-R \quad\quad\quad (II)$$
$$\quad\quad |$$
$$\quad\quad CH_3$$

wherein R has the meaning defined above, with bis(iodomethyl) zinc in an inert humidity-free atmosphere.

The bis(iodomethyl) zinc reagent is conveniently prepared by adding dropwise an ethereal solution of zinc iodide to an ethereal solution of diazomethane. The other reactant, i.e. a compound of Formula II, can then be added to the bis(iodomethyl) zinc solution at a temperature below 0° C., between —5° and —10° C. All these operations have to be carried out in an inert atmosphere, e.g. under nitrogen, and in the absence of humidity.

The bis(iodomethyl)zinc reagent adds a methylene group specifically to the double bond of the terminal isopropylidene group in the compounds of Formula II but does not attack any other double bond present in the molecule. In acidic media the cyclopropane ring of the compounds of Formula I will easily open with formation of a methyl group in the 3-position. These resulting 3-methylated products are valuable intermediates for the synthesis of irone.

As an example, 1,1-dimethyl-2-(3-oxo-butyl-1)-cyclopropane obtained by reacting 6-methyl-5-hepten-2-one [R=—CO—CH$_3$ in Formula II] with bis(iodomethyl) zinc is reacted with zinc and ethyl bromoacetate according to Reformatsky, the resulting tertiary alcohol is subjected to a dehydration and the dehydration product is reduced by means of LiAlH₄ to form the corresponding geraniol derivative which can be converted to the corresponding pseudo-ionone derivative in the manner described below.

In another method 1,1-dimethyl-2-(3-oxo-butyl-1)-cyclopropane is reacted with acetylene and NaNH₂ to form the corresponding dehydrolinalool derivative, the triple bond of which is semi-reduced to form the corresponding linalool derivative. The latter can be treated in the manner described below.

As a further example, 1,1-dimethyl-2-(3-methyl-5-acetoxy-3-penten-1-yl)-cyclopropane obtained by reacting geraniol [R=—C(CH₃)=CH—CH₂OH in Formula II] in the form of its acetate with bis(iodomethyl) zinc is converted to the corresponding pseudo-ionone derivative by saponification followed by oxidation and condensation in acetone solution in the presence of aluminum trialcoholate according to Oppenauer/Lauchenauer.

In another method the cyclopropane derivative of geraniol can be oxidized by means of $MnO_2$ to form the corresponding citral derivative which can then be condensed with acetone to form the corresponding pseudo-ionone derivative.

As a further example, 1,1-dimethyl-2-(3-methyl-5-oxo-3-penten-1-yl)-cyclopropane obtained by reacting citral [R=—C(CH₃)=CH—CHO in Formula II] with bis(iodomethyl) zinc is subjected to an allyl rearrangement according to known methods to form the corresponding geraniol derivative which is then converted to the corresponding pseudo-ionone derivative in the manner described above.

The invention is further illustrated by the following examples, without being limited thereto.

Example 1

60 g. of zinc iodide were dissolved in 200 ml. of absolute ether in a humidity-free nitrogen atmosphere in a 3 neck flask. 500 ml. of ethereal diazomethane solution (about 0.8 N) were dropped into the zinc iodide solution in the course of 45 minutes while cooling with ice. The bis(iodomethyl) zinc content of the reaction solution was determined iodometrically. The solution was about 0.19 molar which corresponds to a yield of about 71% based on zinc iodide.

700 ml. of the reagent solution were concentrated to about 150 ml. in a rotary evaporator at a bath temperature of −5 to −10° C. with exclusion of humidity. 16.7 g. of 6-methyl-5-hepten-2-one were then added to the concentrated solution in a nitrogen atmosphere, and the whole was agitated. The yellowish solution was then slowly heated to room temperature and then refluxed for 2 hours (bath temperature 50° C.). The reaction mixture was then poured onto ice, taken up in ether, the ethereal extract extracted several times with ice water, then with diluted ammonia and finally with ice water until neutral. After drying of the extract over sodium sulfate and removal of the ether the crude product was distilled from a Claisen flask in the vacuum of a water jet pump. 14.82 g. of distillate of B.P. 51.5 to 85° C. at 13 torr were obtained. This distillate contained 82% of 1,1-dimethyl-2-(3-oxo-butyl-1)-cyclopropane. The cyclopropane derivative purified by repeated distillation and gas chromatography was a colorless volatile oil whose odor was similar to that of methyl heptenone and which had the following properties: $n_D^{20}=1.4310$, $d_4^{20}=0.858$.

*Analysis.*—Calculated for $C_9H_{16}O$: C, 77.09%; H, 11.50%. Found: C, 77.06%; H, 11.57%.

Example 2

10.5 g. of geranyl acetate were mixed at low temperature in the manner described in Example 1 with 150 ml. of bis(iodomethyl) zinc solution [containing 0.12 mole of $Zn(CH_2J)_2$]. The mixture was heated to room temperature and then refluxed for 2 hours. After working up in the manner described in Example 1 there were obtained 11.2 g. of crude product yielding, on distillation in a high vacuum, 9.1 g. of distillate of B.P. 110–120° C./0.1 torr, $n_D^{20}=1.4591$. This distillate contained about 81% of 1,1-dimethyl-2-(3-methyl-5-acetoxy-3-penten-1-yl)-cyclopropane.

Example 3

9.1 g. of citral were mixed at 0° C. with 150 ml. of bis(iodomethyl) zinc solution (containing 0.12 mole of bis(iodomethyl) zinc). The mixture was heated to room temperature and refluxed for 2 hours. After working up in the manner described in Example 1 and distillation of the crude product in a high vacuum there were obtained 6.2 g. of yellow oil of B.P. 53–70° C./0.1 torr; $n_D^{20}=1.4783$; $\lambda_{max}=240$ m$\mu$ ($\epsilon=12000$). This distillate contained 72% of 1,1-dimethyl-2-(3-methyl-5-oxo-3-penten-1-yl)-cyclopropane.

Example 4

1020 ml. of a 0.132 molar bis(iodomethyl) zinc solution (prepared in the manner described in Example 1) were concentrated to about 200 ml. in a rotary evaporator with exclusion of humidity at a bath temperature of −5° C. Then, 13.1 g. of trans-pseudo-ionone ($n_D^{20}=1.5341$; $\lambda_{max}=294$ m$\mu$; $\epsilon=14500$) were introduced into the concentrated solution. The temperature of the reaction mixture was permitted to rise to room temperature, and subsequently the mixture was heated for 2 hours at a bath temperature of 50° C. The treatment of the reaction mixture was carried out in the manner described in Example 1. 13.8 g. of crude product were obtained and distilled in a high vacuum from a Claisen flask. 10.41 g. of 1,1-dimethyl-2-(3-methyl-7-oxo-3,5-octadien-1-yl)-cyclopropane of B.P. 100–129° C./0.05 torr ($n_D^{20}=1.5210$; $d^{20}=0.848$; $\lambda_{max}=293$ m$\mu$; $\epsilon=245000$) were obtained. Yield: 74.9%, based on pseudo-ionone.

To 0.5 ml. of 84% phosphoric acid cooled with an ice-NaCl mixture 100 mg. of 1,1-dimethyl-2-(3-methyl-7-oxo-3,5-octadien-1-yl)-cyclopropane were added slowly with constant stirring by means of a magnetic stirrer, the reaction mixture was then stirred for 30 minutes in the cold and subsequently heated for 10 minutes to 50° C. The brown-red cyclization product was poured onto ice and taken up in pentane. The extract was twice extracted with saturated sodium bicarbonate solution and twice with saturated NaCl solution, dried over sodium sulfate and the pentane was removed. Distillation of the crude product yielded a yellow oil of B.P. 90° C./0.1 torr; $n_D^{20}=1.5081$. Yield of cyclization product: about 80%. As determined by gas chromatography, this product contained about 56% of trans-α-irone, about 22% of β-irone, and about 18% of cis-α-irone.

Example 5

To 5 ml. of 84% phosphoric acid which were cooled in an ice/NaCl mixture there was slowly added 1 g. of 1,1-dimethyl-2-(3-methyl-7-oxo-3,5-octadien-1-yl)-cyclopropane (prepared from trans-pseudo-ionone in the manner described in Example 4), and the mixture was then stirred for 30 minutes while cooling. The mixture was subsequently heated for 10 minutes to 50–55° C. (bath temperature), then poured onto ice water, taken up in pentane, extracted once with sodium bicarbonate solution and several times with NaCl solution, dried over sodium sulfate, and the pentane was removed. The residue was distilled at 0.1 torr and a bath temperature of 90–100° C. Yield: 720 mg.=72%; $n_D^{20}=1.5051$. As determined by gas chromatography the resulting product contained about 60% of trans-α-irone, about 21% of cis-α-irone and about 12.5% of β-irone.

Example 6

20 mg. of 1,1-dimethyl-2-(3-methyl-7-oxo-3,5-octadien-1-yl)-cyclopropane (prepared from trans-pseudo-ionone in the manner described in Example 4) were slowly added at room temperature to a mixture of 1 part of saturated mono-sodium phosphate solution and 10 parts of 84% phosphoric acid. The mixture was then stirred for 20 minutes. The reaction solution was poured into a mixture of ice and sodium bicarbonate solution, taken up in ether and extracted several times with water. After drying of the etheral extract with sodium sulfate and removal of the ether the residue was distilled in a high vacuum at a bath temperature of 90–100° C. The yield was 14 mg. of a product containing about 55% of trans-α-irone, about 30% of cis-α-irone and about 11% of β-irone.

Example 7

20 mg. of 1,1-dimethyl-2-(3-methyl-7-oxo-3,5-octadien-1-yl)-cyclopropane (prepared from trans-pseudo-ionone in the manner described in Example 4) were dissolved in 0.5 ml. of pentane, and the solution was added at 10° C. to a mixture of 0.5 ml. of pentane and 1 ml. of 65% sulfuric acid. The reaction mixture was stirred for 1 hour at 10° C. and then poured into a mixture of ice and sodium bicarbonate solution. The product obtained after the usual treatment was distilled in a high vacuum. The yield was 12 mg. of a product containing about 56% of trans-α-irone, about 23% of cis-α-irone and about 14% of β-irone.

We claim:
1. Compounds of the formula

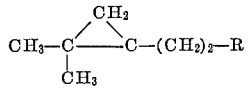

wherein R represents one of the radicals

—C(OH)(CH₃)—CH=CH₂

—C(CH₃)=CH—CH₂OOCCH₃ and —C(CH₃)=CH—CHO.

2. 1,1 - dimethyl-2-(3-methyl-5-acetoxy-3-penten-1-yl)-cyclopropane.

3. 1,1 - dimethyl - 2 - (3-methyl-5-oxo-3-penten-1-yl)-cyclopropane.

References Cited

UNITED STATES PATENTS 3,342,877  9/1967  Julia _____ 260—617

OTHER REFERENCES

Chem. Absts., 35: 6931 (1941).

LORRAINE A. WEINBERGER, Primary Examiner

V. GARNER, Assistant Examiner

U.S. Cl. X.R.

252—522; 260—586, 587, 598, 617

PO-1050
(5/69)

UNITED STATES PATENT OFFICE
CERTIFICATE OF CORRECTION

Patent No. 3,470,241      Dated September 30, 1969

Inventor(s) ALBERT ESCHENMOSER, DOROTHEA FELIX and MAX STOLL

It is certified that error appears in the above-identified patent and that said Letters Patent are hereby corrected as shown below:

Column 1, line 22 "caomplex" should read --complex--

Column 1, line 38 "Bronated" should read -- Bronsted--

Column 2, line 58 after 0° C. and before between -5° should be the words --e.g.,-

Column 4, line 17 "B.P. 53-70°C" should read --B.P. 63-70° C.--

Column 4, line 39 "245000)" should be --24500)--

SIGNED AND
SEALED
MAY 26 1970

(SEAL)
Attest:

Edward M. Fletcher, Jr.
Attesting Officer

WILLIAM E. SCHUYLER, JR.
Commissioner of Patents